United States Patent [19]
Dougherty, deceased et al.

[11] 3,853,229
[45] Dec. 10, 1974

[54] BALE ACCUMULATOR

[76] Inventors: Gary J. Dougherty, deceased, late of Rt. 2, Deer Park, Wash. 99006 Othilia Dougherty, executrix; George O. Prufer, Rt. 2, Deer Park, Wash. 99006

[22] Filed: July 19, 1971

[21] Appl. No.: 163,913

[52] U.S. Cl. .................... 214/6 B, 214/7, 214/501
[51] Int. Cl. ............................................. B65g 57/32
[58] Field of Search ............. 214/6 B, 501, 7, 6 DK, 214/6 M

[56] References Cited
UNITED STATES PATENTS

| | | | |
|---|---|---|---|
| 2,316,435 | 4/1943 | James | 214/6 B UX |
| 2,587,877 | 6/1971 | Hornibrook | 214/7 |
| 2,702,131 | 2/1955 | Leupke | 214/6 B |
| 3,402,832 | 9/1968 | Wehde | 214/6 B |
| 3,471,036 | 10/1969 | Thomas et al. | 214/6 M |
| 3,531,001 | 9/1970 | Lunden | 214/6 DK |

Primary Examiner—Robert J. Spar
Attorney, Agent, or Firm—Keith S. Bergman

[57] ABSTRACT

A bale accumulator adapted to receive bales from a baler, turn the bales 90° about their longitudinal axes, assemble them into successive clusters and deposit the clusters upon the ground with their bale ties in horizontal planes.

3 Claims, 12 Drawing Figures

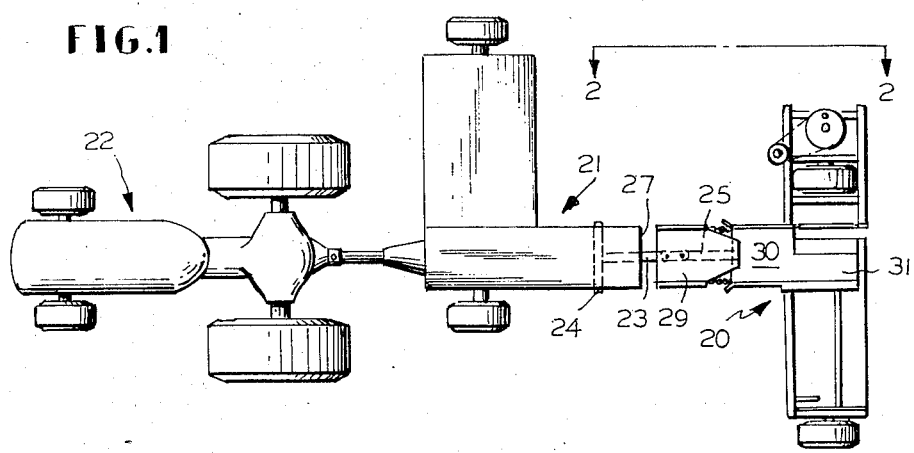
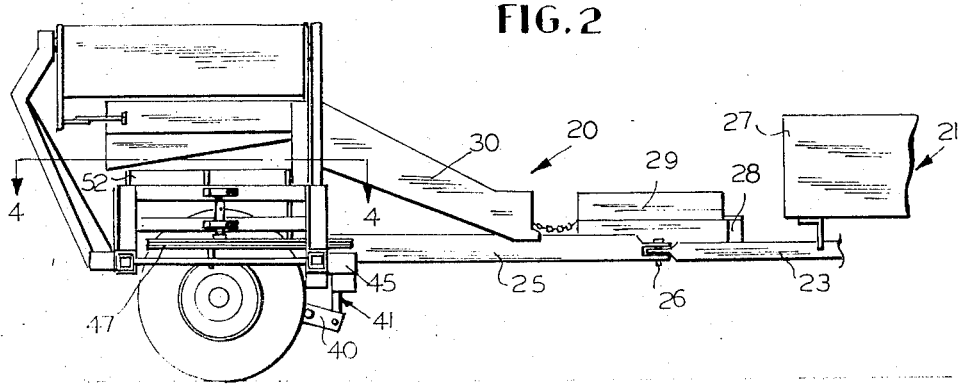
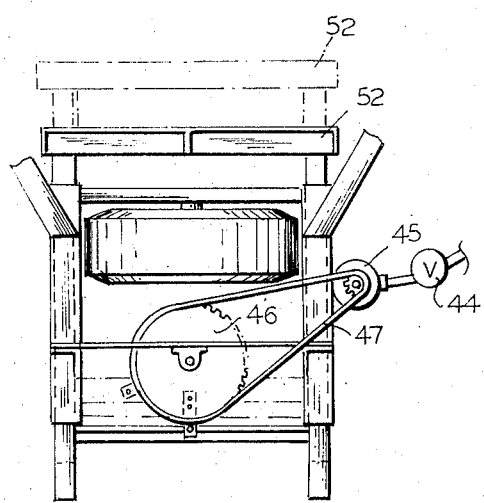

INVENTORS
GARY J. DOUGHERTY
GEORGE O. PRUFER

BY *Norman H. Roff*

ATTORNEY

INVENTORS
GARY J. DOUGHERTY
GEORGE O. PRUFER
BY
ATTORNEY

INVENTORS
GARY J. DOUGHERTY
GEORGE O. PRUFER

BY *Vernon D. Koeff*

ATTORNEY

BALE ACCUMULATOR

Our present invention relates to a bale accumulator which is articulately attachable to and towed by a mobilized baler and is adapted to receive tied bales from the baler with their ties encircling the bales in vertical planes, rotate each bale about its longitudinal axis 90° to dispose its tie(s) horizontally, assemble a predetermined quantity of bales into a cluster of bales arranged side by side and deposit the cluster upon the field surface.

An object of our invention is to provide a bale accumulator which receives bales from a baler, assembles a predetermined number of bales into a cluster having their ties disposed in horizontal planes and discharges the said cluster when the predetermined number of bales has been accumulated and assembled.

Another object of our invention is to provide a bale accumulator which is adapted to be towed behind a baler by a tractor or by a self-propelled baler and supplied hydraulic power thereby.

Another object of our invention is to provide a bale accumulator which is hingedly connected to the towing vehicle to provide an articulated bale guide to allow transfer of a bale when the accumulator is angularly displaced relative to the baler.

Yet another object of our invention is to provide such a bale accumulator wherein bales are accumulated in a discharge station within an enclosing peripheral framework which positively maintains the bales until predetermined release.

Still another object of our invention is to provide such a bale accumulator with bale hold-down means on the accumulator bed to stabilize accumulating bales.

Yet another object of our present invention lies in the provision of a new and improved bale accumulator of simple and relatively inexpensive construction and operation and not liable to become inoperative.

A still further object of our invention is to provide an improved bale accumulator constructed from a minimum number of readily available parts thus permitting operation and maintenance by a person or ordinary skill and manual dexterity with basic hand tools.

The foregoing and other objects and advantages of the present invention will become more apparent and meaningful during the course of the following specification when considered in association with the accompanying drawings wherein a preferred form of the invention is graphically illustrated. It is to be understood however, that the drawings are illustrative only and are not intended to limit the scope of the invention. It should also be understood that various changes in construction may be resorted to in the course of manufacture without in any way departing from the spirit of the invention which is to be understood only in accordance with the appended claims. Furthermore, it is to be understood that while the invention is described in one particular association, it is not our intention to unnecessarily limit the appplicability of the invention, but we desire to reserve to ourselves the claimed invention for every use of which it is now known or subsequently discovered to be susceptible.

In the accompanying drawings:

FIG. 1 is a plan view showing a conventional tractor and baler with our accumulator attached;

FIG. 2 is an enlarged side elevation of our accumulator viewed from the right side as at line 2—2 of FIG. 1 and looking in the direction of the arrows;

FIG. 4 is a fragmentary plan view of the bale advancing plate operating means as at line 4—4 of FIG. 2;

Figure 3:
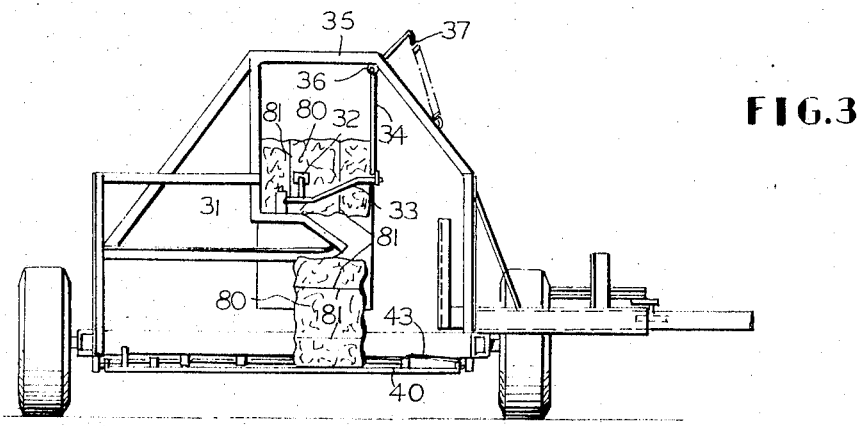
FIG. 3 is a rear elevation.
Figure 11:
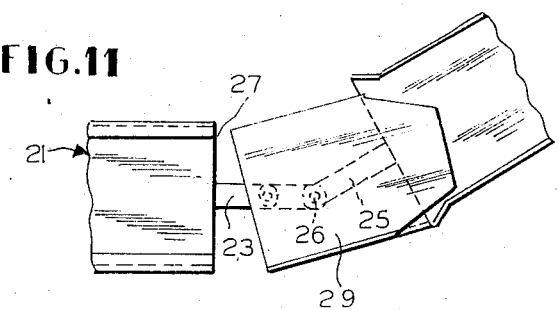
FIG. 11 is a fragmentary plan view of the articulate bale way between the baler and the accumulator.

Referring now to FIG. 1, our accumulator is indicated by reference numeral 20 and is drawn by a conventional baler 21 which may be of the self-propelled type or may be drawn by tractor 22. In either event, a conventional source of hydraulic fluid under pressure (not shown), is provided for purposes subsequently to be described.

The baler 21 is provided with a rearwardly extending rigid towing bar 23 fixed thereto by means of yoke 24. At its rearward end, a draw bar 25 is hingedly connected in a common and well known manner by inserting a coupling pin 26 through aligned apertures in interdigitating hitch members.

Figure 8:
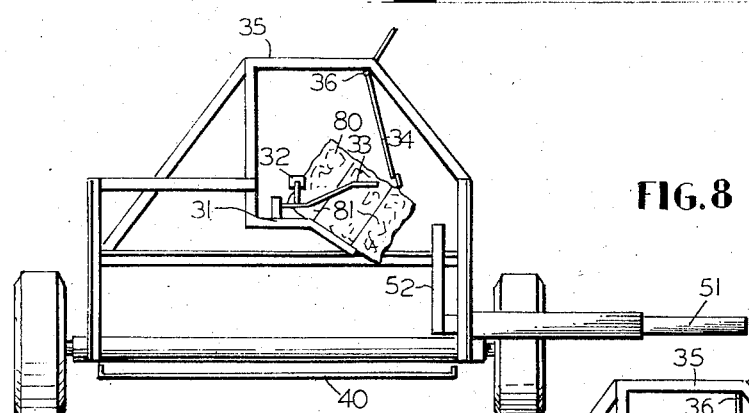
Figure 9:
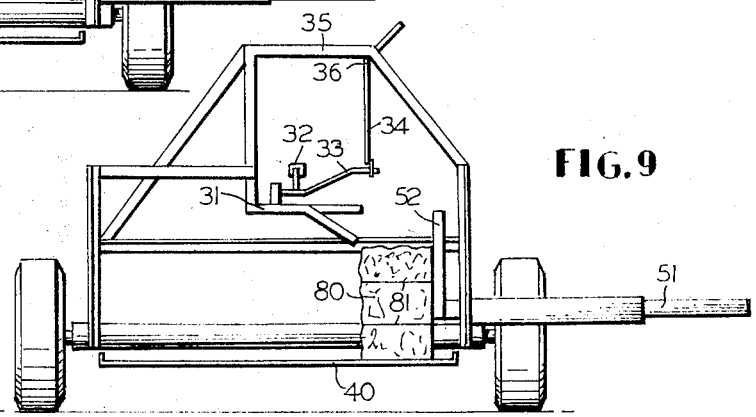
Figure 10:
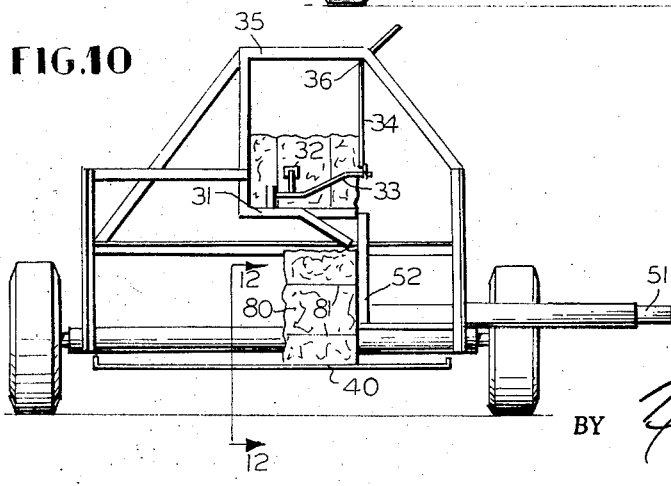

Substantially midway between the pin 26 and the bale discharge opening 27 we provide a pivot 28 about a vertical axis for the forward end of a pivotable articulated bale-guide trough 29 which structure attenuates the abruptness of the angle between the baler 21 and the trailing accumulator 20 when the assemblage is traversing a corner and thus assists in directing each successive bale 80 discharged from the baler 21 to make the transition between the baler and the accumulator and to follow the inclined trough 30 up to the ledge 31. Here the bales 80 are momentarily supported on one longer side by a vertical side plate 62, on another side by swingable gate 34, and on the bottom by ledge 31 having an inner portion which provides horizontal support shelf slightly less than one-half the width of a bale 80, and an outer portion which angles laterally and downwardly to provide a turning chute 63. When each bale reaches the extremity of movement desired longitudinally along its axis, it strikes the strike-plate 32 carried by latch arm 33 which releases the lower edge of the swingable keeper 34 hingedly supported at its upper edge to the frame 35 at 36 yieldably held in the vertical plane by gravity and a spring assist 37. (Compare FIGS. 3, 7-10). When the latch 33 is released, the weight of the bale 80 (FIG. 8) displaces keeper 34 as one lateral edge of the bale is gravity displaced downward onto turning chute 63 to thence continue its rotational movement as it falls to the platform 40 traversing a 90° axial roll while so doing thus changing the orientation of the bale ties 81-81 from vertical planes, as they come from the baler 21, to horizontal planes.

Platform 40 is supported in substantially a horizontal plane by being hingedly carried along its forward edge at 42 by the frame 35 and releasably held against tilting by an over-center breakjoint 41.

As each successive bale 80 falls onto the platform 40, it strikes and depresses lever 43 which, in turnm activates a sequence valve 44 in the aforesaid hydraulic pressure system, which controls hydraulic motor 45 to impart one complete revolution to the bull wheel 46 through drive chain 47.

Figure 6:
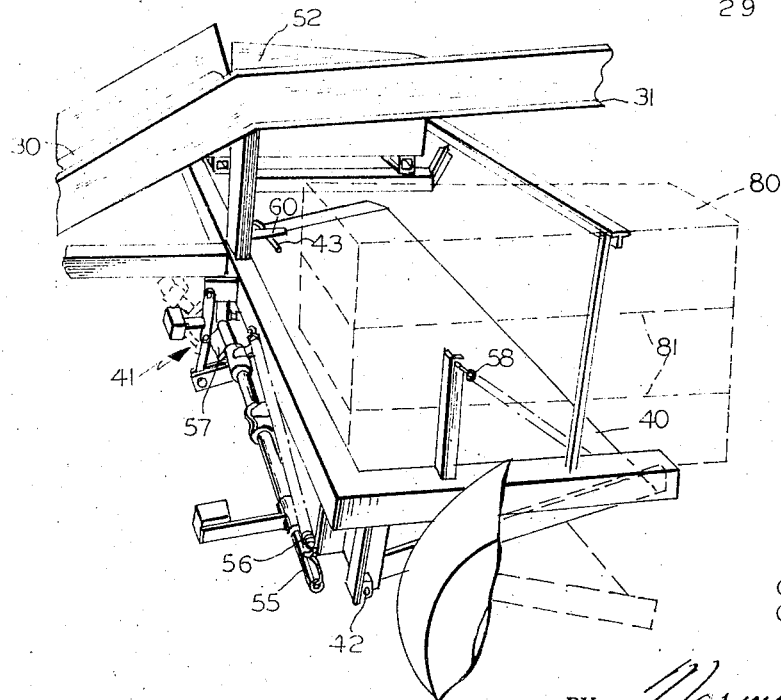
FIG. 6 is a fragmentary perspective view showing the frame and accumulator platform hinge mechanism.
Figure 5:
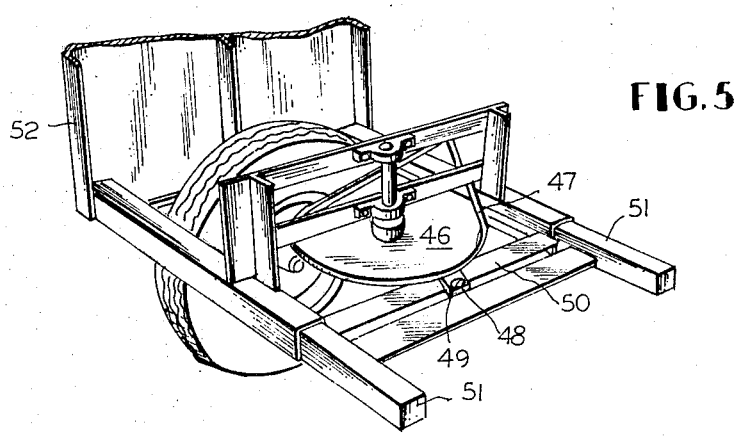
FIG. 5 is a fragmentary perspective view of the mechanism of FIG. 4.
Figure 12:
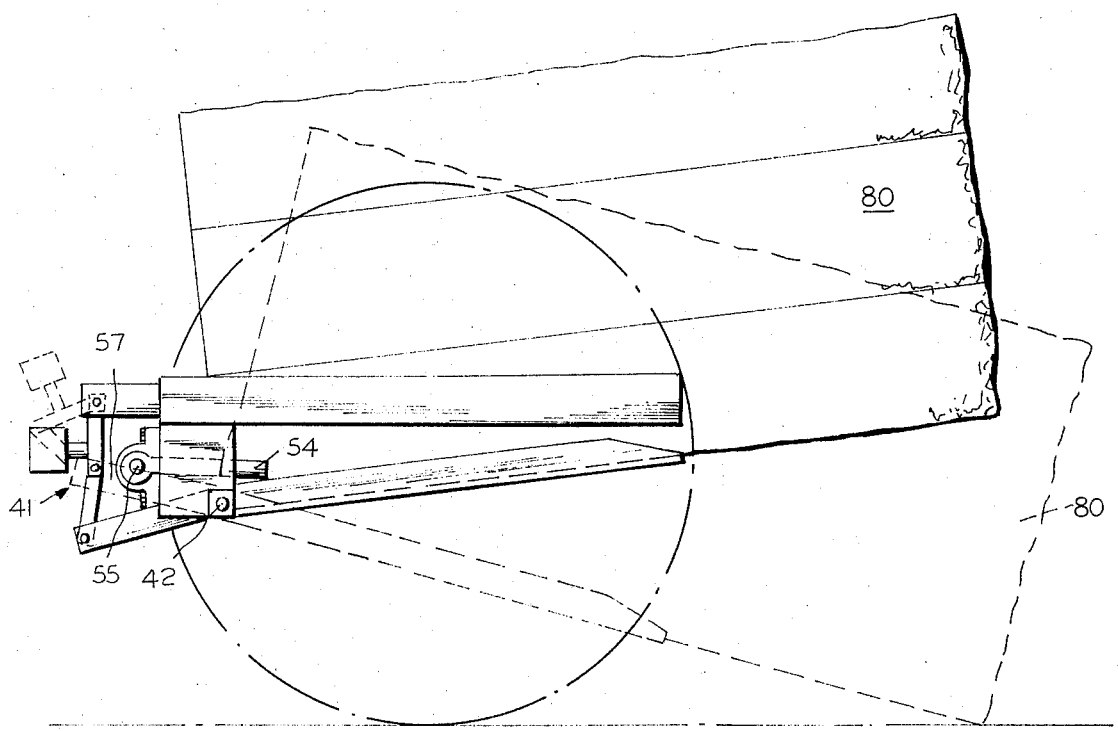
FIG. 12 is an enlarged longitudinal view on a vertical plane through the bale platform, as at line 12—12 of FIG. 10.
Figure 7:
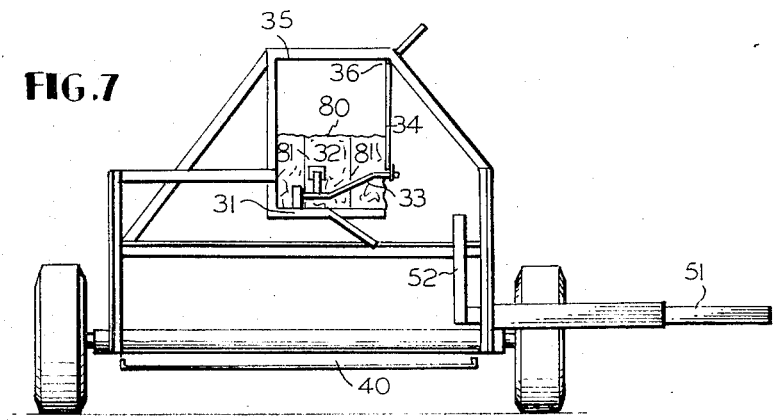
FIGS. 7, 8, 9 and 10 are front elevational line drawings showing, in sequence, the operations of the accumulator upon a bale.

Radial arm 48 carries a throw 49 disposed in the way 50 of slide frame 51 which supports the advancing plate 52. As the bull-wheel 46 rotates, the slide frame 51 reciprocates shifting the advancing plate 52 to move the bale 80 laterally providing space for the next successive bale. As the bales are shifted laterally on platform 40, they are slid under horizontal retention bar 61 which locally compresses the bale and exerts a downward force thereon to prevent accidental dislodgement. As each bale falls, the shifting sequence continues successively until a cluster, minus one, is on the platform, at which time the first bale to fall has been shifted to one extreme lateral side of the platform wherein it has struck arm 54 (FIGS. 5, 6, and 12) attached to reciprocal shaft 55 and moved it laterally against the tension of return spring 56 to bring flange 57 in registry with the over-center break-joint 41 and at the same time carries into the path of the next falling bale a previously protected radial lever 60 carried by shaft 55, so that when the last bale 80 of a cluster falls, the pivoting shaft 55 heretofore would have actuated the motor 45, now breaks the joint 41 and permits the platform to pivot to the broken line position of FIG. 12 to discharge the cluster of bales.

As the shaft 55 is shifted laterally to bring lever 60 into the path of the last-to-fall bale, it also brings into play a catch mechanism (not shown) which deactivates the function of lever 43 so that the last-to-fall bale does not actuate the sequencing valve 44.

After the weight of the cluster is removed from the platform, springs as 58 return the platform to the initial position to receive subsequent bales, and spring 56 returns the shaft 55 to normal for the previously described sequence operations for loading bales on platform 40.

Having thus described our invention, we desire to secure by Letters Patent of the United States the following:

1. A bale accumulator adapted to be pulled by and receive from a baler successive bales of hay of predetermined dimensions bound by at least one tie encircling each bale in a vertical plane, said accumulator adapted to turn and assemble a predetermined number of said bales into a cluster and discharge the cluster onto the surface of a field with said ties disposed in horizontal planes, comprising:
   a mobile frame adapted to be pivotably connected to and towed by a baler with an articulated bale guide having a relatively short trough like element pivotally supported about a vertical axis by the baler to attenuate the abruptness of the angle between the baler and bale accumulator to aid bale passage therebetween;
   a generally horizontal bale bed mounted on said frame for tilting about an axis generally transverse to the direction of travel of said accumulator and adapted to receive plural bales thereon and discharge the bales received rearwardly thereof in a prearranged cluster wherein
   an inclined trough is adapted to receive successive bales each bound by a tie encircling its bale in a vertical plane, direct movement of said bales to a point above said bed, and deposit the said bales in reoriented contiguous side by side relationship on said bed with their ties in horizontal planes and their longitudinal axes substantially parallel with the direction of travel of said bale accumulator, whereby to form a stable cluster of plural bales;
   said articulated bale guide extending across the point of interconnection between the baler and the mobile frame and to within one bale length of the inclined trough;
   means for advancing on said bed transversely of the direction of movement each oriented bale received from said bale orienting means one bale width to permit receipt of subsequent bales; and
   means adapted to tilt said bed and discharge the cluster with the bales in substantially the same orientation onto the surface of the field traversed by said accumulator; wherein the inclined trough further includes
   an elevated ledge more narrow than one-half the width of a bale and disposed above said bed and adapted to support the bottom edge only of a bale, a vertical side frame rigidly joined to one lateral edge of said elevated ledge to support a bale on a first vertical edge,
   a gate swingable on an axis parallel to the longitudinal axis of said bale and releasably secured to confine a second vertical edge of a bale against removal laterally from said ledge, and means adapted to open said gate releasing the second edge of the bale to allow the bale to fall by gravity onto said bed and traverse a 90 degree rotation effected by said first bale edge being momentarily supported by said ledge during the initial falling movement of said bale.

2. The bale accumulator of claim 1 wherein said means for advancing each oriented bale, comprises:
   a push plate disposed in a vertical plane parallel to the direction of movement of said accumulator at the bale receiving end of said bed and mounted for movements perpendicular to said plane;
   a pitman adapted to move said push plate;
   a crank arm adapted to actuate said pitman;
   a hydraulic motor adapted to drive said crank arm and thereby move said push plate,
   said crank arm having a throw sufficient to advance said push plate a distance sufficient to advance each successive bale one bale width.

3. The bale accumulator of claim 1 further comprising:
   an elongate hold-down bar horizontally disposed above the bale bed slightly less than the height of one bale and parallel to the longitudinal axis thereof to maintain said accumulated bales on said bale bed.

* * * * *